United States Patent [19]

Ebihara et al.

[11] 4,149,146
[45] Apr. 10, 1979

[54] DRIVER CIRCUIT FOR ELECTROCHROMIC DISPLAY DEVICE

[75] Inventors: Heihachiro Ebihara; Fukuo Sekiya, both of Tokorozawa, Japan

[73] Assignee: Citizen Watch Company Limited, Tokyo, Japan

[21] Appl. No.: 766,151

[22] Filed: Feb. 7, 1977

[30] Foreign Application Priority Data

Feb. 9, 1976 [JP] Japan .................................. 51-13092

[51] Int. Cl.² .............................................. G06F 3/14
[52] U.S. Cl. .................................... 58/23 R; 340/763; 340/706; 340/785; 340/803; 58/50 R; 350/357
[58] Field of Search ............. 340/324 R, 324 M, 336; 350/160 R, 357; 58/50 R

[56] References Cited

U.S. PATENT DOCUMENTS

| | | | |
|---|---|---|---|
| 3,096,271 | 7/1963 | Hespenheide | 340/324 R |
| 3,736,043 | 5/1973 | Sambucetti | 340/324 R |
| 3,839,857 | 10/1974 | Berets et al. | 340/324 R |
| 3,938,131 | 2/1976 | Van Doorn et al. | 340/324 R |
| 4,005,404 | 1/1977 | Soobik | 340/324 M |

Primary Examiner—Marshall M. Curtis
Attorney, Agent, or Firm—Frank J. Jordan

[57] ABSTRACT

An electronic device equipped with an electrochromic display device adapted to provide a display of information, which comprises a logic circuit arranged to provide a serial data, and a driver circuit composed of a serial/parallel converter to convert the serial data into a parallel data and a plurality of driver means responsive to the parallel data to drive the corresponding segment electrodes of the electrochromic display device in coloring and bleaching directions. The driver circuit may further include a segment selection circuit to enable a selected one of the driver means corresponding to the segment whose display state is to be changed over.

3 Claims, 3 Drawing Figures

| IN$_1$ | IN$_2$ | OUT |
|---|---|---|
| 0 | 0 | 1 |
| 1 | 1 | 0 |
| 0 | 1 | 1 |
| 1 | 0 | 1 |

$\begin{pmatrix} 0 : \text{Tr 82 ON} \\ 1 : \text{Tr 82 OFF} \end{pmatrix}$

DRIVER CIRCUIT FOR ELECTROCHROMIC DISPLAY DEVICE

This invention relates to portable electronic devices such as desk calculators or electronic timepieces and more particularly to a portable electronic device having an electrochromic display device.

Although liquid crystal display devices have been widely exploited as electro-optical display means, electrochromic display devices have been recently proposed for electronic devices such as electronic timepieces or desk calculators. Such devices exibit a persistence or memory function and requires a large amount of driving current. Therefore, in order to drive the electrochromic display devices by a driver circuit using metal oxide semiconductor field effect transistors (MOSFETs), it is required that driving MOSFETs be largely sized, increasing the size of an integrated circuit chip to an excessively larger extent. To solve this problem, it has been proposed to provide a logic circuit and a driver circuit incorporated in respective integrated circuit chips separated from each other. Since, however, the driver circuit is usually arranged to receive output signals from the logic circuit in parallel form, the respective integrated circuit chips for the logic circuit and the driver circuit have a large number of output and input terminals, respectively. These terminals should be coupled with each other, using a large number of circuit connections with require skilled techniques and make it difficult to assemble the electronic device in an easy fashion.

It is, therefore, an object of the present invention to provide a driver circuit specifically suited for use in an electrochromic display device of a portable electronic device.

It is another object of the present invention to provide a driver circuit for an electrochromic display device of an electronic device, which driver circuit can be incorporated in an integrated circuit chip of a small size and does not require a large number of circuit connections between the driver circuit and a logic circuit of the electronic device.

It is another object of the present invention to provide a driver circuit for an electrochromic display device which provides a low power consumption.

It is still another object of the present invention to provide a portable electronic device incorporating an electrochromic display device driven by a driver circuit which is simple in construction and low in manufacturing costs.

These and other objects, features and advantages of the present invention will become more apparent from the following description when taken in conjunction with the accompanying drawings, in which.

Before entering into detail description of the present invention, it should be noted that while the present invention will be described as applied to an electronic timepiece it may also be applied to other portable electronic devices such as desk calculators.

Figure 1:
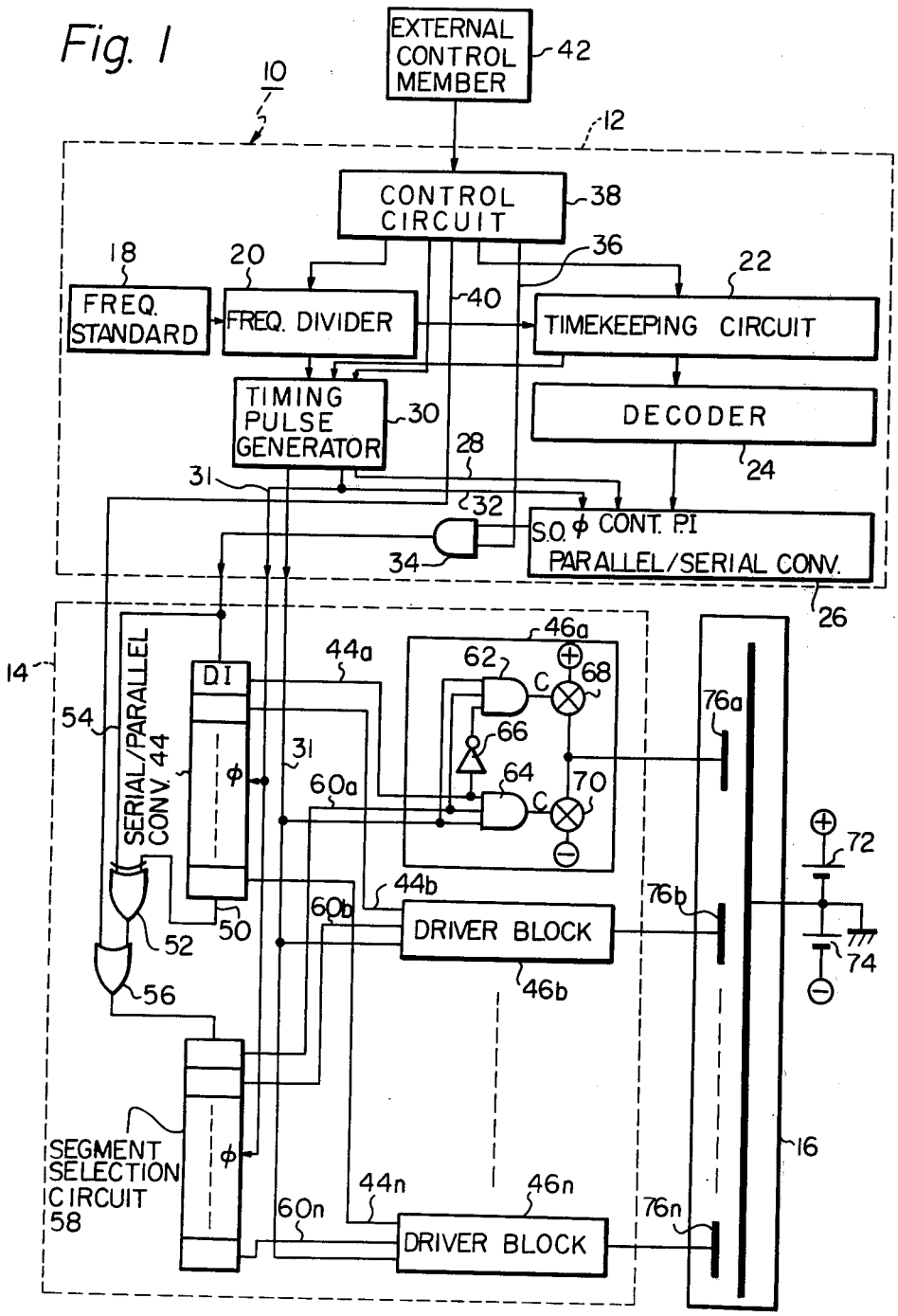
FIG. 1 is a block diagram of a preferred embodiment of a portable electronic device incorporating a driver circuit according to the present invention.

Referring now to FIG. 1, a portable electronic device 10 comprises a logic circuit 12 incorporated in an integrated circuit (IC) chip constituted by MOSFETs to provide output signals in serial form, and a driver circuit 14 incorporated in an IC chip constituted by bipolar transistors and responsive to the output signals from the logic circuit 12 to drive an electrochromic display device (hereinafter referred to as EC display device) 16.

The logic circuit 12 is shown as composed of an electronic timepiece, which comprises a frequency standard 18, a frequency divider 20, and a timekeeping circuit 22. The frequency standard 18 is controlled by a quartz crystal (not shown) to provide a relatively high frequency signal of, for example, 32,768 Hz. This relatively high frequency signal is applied to the frequency divider 20, which is composed of a plurality of series connected flip-flops (not shown) to divide down the relatively high frequency signal to provide a low frequency signal of 1 Hz as a time unit signal and provide a second low frequency signal higher in frequency than the time unit signal for a reason as will be described hereinafter. The time unit signal is applied to the timekeeping circuit 22, which is composed of a plurality of counters (not shown) to provide various time information signals. These time information signals are decoded by a decoder 24, which provides decoded outputs in parallel form. These outputs are parallely input to a parallel/serial converter 26 composed of a shift register in response to a data input enabling signal. This enabling signal is generated by a timing pulse generator 30 in response to the second low frequency signal from the frequency divider 20 and applied through lead 28 to a control terminal CONT of the parallel/serial converter 26. The timing pulse generator 30 also generates a clock signal and a timing pulse in response to the second low frequency signal from the frequency divider 20. The clock signal is applied through lead 32 to a clock input terminal $\phi$ of the parallel/serial converter 26, by which output signals are produced as a serial output data in sequence, i.e., in serial form in response to the clock signal. This serial output data is applied through an AND gate 34 to the driver circuit 14. The AND gate 34 is normally opened and inhibited in response to a display erasure signal applied through lead 36 from a control circuit 38. The control circuit 38 is connected to and energized by an external control member 42, to generate control signals for controlling the frequency divider 20, the timekeeping circuit 22, and the timing pulse generator 30 to perform desired functions such as time corrections. The control circuit 38 also generates an initial data writing-in signal which is applied through lead 40 to the driver circuit 14 in specific cases, i.e., when a battery is replaced.

It should now be understood that the logic circuit 12 is arranged to provide a serial data to reduce the number of circuit connections between the logic circuit 12 and the driver circuit 14. The serial data from the logic circuit 12 is subsequently converted into the parallel data in the driver circuit 14. To this end, the driver circuit 14 comprises a serial/parallel converter 44 having its input coupled to an output of the parallel/serial converter 26 of the logic circuit 12 through the AND gate 34. The output signals from the parallel/serial converter 26 are sequentially stored in the serial/parallel converter 44, which produces output signals in parallel form to control the direction of flow of an electric current applied to the EC display device 16. To this end, each of these output signals are applied through leads 44a, 44b, ... and 44n to each of driver blocks 46a, 46b, ... and 46n, respectively, to which the timing pulse on lead 31 is also applied to provide a timing at which the EC display device 16 is rendered conductive. The serial/parallel converter 44 also generates a serial data as a previous display data, which is applied through lead 50 to one input of a detection circuit constituted by an Exclusive OR gate 52. The remaining input of the Exclusive OR gate 52 is connected to the output of the serial/parallel converter 26 of the logic circuit 12 through lead 54, to receive a new serial data delivered therefrom as a new display data. Thus, the new display data and the previous display data relating to the same display segment are compared by the Exclusive OR gate 52, which produces coincidence and non-coincidence signals in sequence in dependence on coincidence and non-coincidence between the previous display data and the new display data. When coincidence exists between the previous display data and the new display data relating to a particular display segment, the coincidence signal goes to a "0" logic level. When, however, non-coincidence exists between the previous display data and the new display data relating to a particular display segment, the non-coincidence signal goes to a "1" logic level. The coincidence and non-coincidence signals are applied through an OR gate 56 to a segment selection circuit composed of a serial/parallel converter constituted by a shift register 58. The non-coincidence signal is written in a particular bit of the shift register 58 corresponding to a segment whose display state is to be changed over, while the coincidence signal is written in another bit of the shift register 58 corresponding to another segment whose display state is to remain unchanged. The shift register 58 generates segment selection signals in parallel form in response to the non-coincidence signals generated by the Exclusive OR gate 52. Each of the segment selection signals are applied through each of leads 60a, 60b, ... and 60n to each of the driver blocks 46a, 46b, ... and 46n, so that only a selected driver block or blocks are energized to cause an electric current to flow through only a selected segment electrode or electrodes.

Each of the driver blocks comprises AND gates 62 and 64, inverter 66, and electronic switching elements 68 and 70 constituted by bipolar transistors, respectively, which are conductive when an input C goes to a "1" logic level. The AND gate 64 has a first input connected to the serial/parallel converter 44, to which a first input of the AND gate 62 is also connected through the inverter 66. The second inputs of the AND gates 62 and 64 are connected to the segment selection circuit 58, and third inputs of these gates are connected through lead 31 to the timing pulse generator 30 to receive the timing pulse therefrom. An output of the AND gate 62 is coupled to the input C of the switching element 68, and an output of the AND gate 64 is coupled to the input C of the switching element 70. The switching element 68 has one terminal coupled to a high potential side of a battery 72, and the switching element 70 has one terminal connected to a low potential side of a battery 74. The remaining terminals of the switching elements 68 and 70 are connected together and coupled to the EC display device 16. The EC display device 16 comprises a common electrode 76 connected to a junction between the low potential side of the battery 72 and the high potential side of the battery 74, and a plurality of segment electrodes 76a, 76b, ... and 76n connected to outputs of the driver blocks 46a, 46b, ... and 46n, respectively.

In an initial state of the electronic device 10, it is necessary to cause an electric current to flow through all of the segment electrodes 76a, 76b, ... and 76n of the EC display device 16. To this end, an initial data writing-in signal is generated by the control circuit 38 and applied through lead 40 to the OR gate 56, from which the writing-in signal is applied to the shift register 58. In this instance, a "1" logic level is written in all bits of the shift register 58, which consequently provides segment selection signals to all of the driver blocks 46a, 46b, ... and 46n by which all of the segment electrodes are driven. When the output of the AND gate 62 goes to a "1" logic level, the switching element 68 is rendered conductive. At this instant, the segment electrode is connected to the high potential side of the battery and an electric current flows through this segment electrode in a bleaching direction. In contrast, when the output of the AND gate 64 goes to a "1" logic level, the switching element 70 is rendered conductive. In this instance, the segment electrode is coupled to the low potential side of the battery so that an electric current flows through the segment electrode in a coloring direction. If the output on lead 60a of the shift register 58 corresponding to the segment electrode 76a goes to a "1" logic level, this segment electrode is selected to be driven. Since, at this instant, the timing pulse is applied to the AND gates 62 and 64 through lead 31, either one of the outputs of the AND gates 62 and 64 goes to a "1" logic level for a time interval in which the timing pulse is at a "1" logic level. When parallel data from the converter 44 is at a "1" logic level, the output of the AND gate 64 goes to a "1" logic level, conducting the switching element 70 to cause an electric current to flow through the segment electrode 76a in a coloring direction. When, however, the parallel data from the converter 44 is at a "0" logic level, the output of the AND gate 62 goes to a "1" logic level, conducting the switching element 68 to cause an electric current to flow through the segment electrode 76a in a bleaching direction.

Figures 2A, 2B:
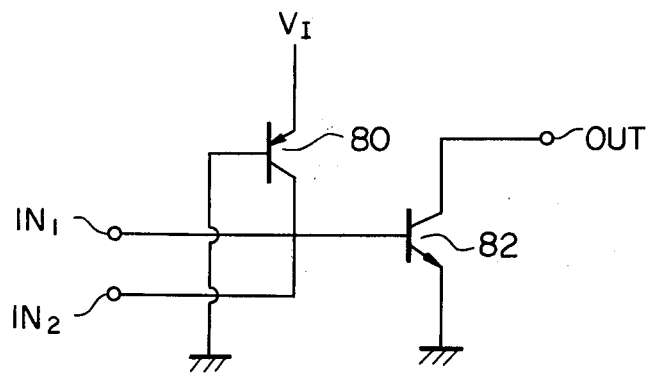
FIG. 2A is an example of an integrated injection logic used in the driver circuit of FIG. 1.
FIG. 2B is a truth table for the circuit of FIG. 2A.

FIG. 2A shows an example of an integrated injection logic (I$^2$L) to be used for the driver circuit 14 of FIG. 1 to minimize the power consumption. In FIG. 2A, the I$^2$L comprises first and second bipolar transistors 80 and 82. The first bipolar transistor 80 acts as an injection transistor and has its base connected to the ground, its emitter applied with an injection voltage $V_I$, and its collector coupled to inputs IN$_1$ and IN$_2$, to which the base of the second transistor 82 is also connected. The emitter of the second transistor 82 is connected to the ground and its collector connected to an output terminal designated as OUT. The truth table for the I$^2$L shown in FIG. 2A is illustrated in FIG. 2B.

It will be appreciated from the foregoing description that in accordance with the present invention an electronic device has a logic circuit arranged to provide a serial data and a driver circuit including a serial/parallel converter and a plurality of driver block means coupled in parallel to outputs of the serial/parallel converter whereby the number of circuit connections between IC chips can be remarkably reduced to provide easy assembling of the device. It should also be noted that in accordance with the present invention the logic circuit is incorporated in an IC chip constituted by MOSFETs and the driver circuit is incorporated in an IC chip constituted by bipolar transistors whereby the electronic device can be manufactured in smaller size to a practicable use for various portable electronic devices such as desk calculators, electronic timepieces, etc. Since, further, the driver circuit forming part of the electronic device of the present invention is constituted by an integrated injection logic, the power consumption can be remarkably reduced. It should also be born in mind that a principal concept of the present invention can be applied to not only an electronic device equipped with an EC display device but also other portable electronic devices having display devices which can not be driven in a matrix mode and cosume a large amount of power consumption.

While the present invention has been shown and described with reference to a particular embodiment by way of example, it should be noted that various other modifications or changes may be made without departing from the scope of the present invention. For example, the logic circuit 12 may comprise a keyboard and a calculation circuit controlled by the keyboard to provide various calculated data as in a desk calculator. In this case, the calculation circuit should be arranged to provide the various calculated data in time sequence to the driver circuit 14. In cases where the timekeeping circuit 22 is constituted by a ring shift register in which various time data are shifted, further, outputs can be applied to the driver circuit 14 from a particular bit of the ring shift register. In this case, the driver circuit 14 may include a decoder for decoding the serial data from the ring shift register into decoded outputs representing various digits such as a unit of seconds, tens of seconds, a unit of minutes, tens of minutes, and hours, etc., in every four bits. These decoded outputs are applied as seven or eight segment signals to the converter 44. In addition, although the driver circuit has been described as constituted by bipolar transistors, it should be understood that the driver circuit may also be constituted by MOSFETs.

What is claimed is:

1. In an electronic device having an electrochromic display device having a common electrode connected to a power supply and a plurality of segment electrodes associated therewith to provide a display of information, the combination comprising:
  a logic circuit including means for generating display information signals in a parallel form, a timing pulse generator for generating clock pulses, and a parallel/serial converter connected to said display information signal generating means for generating serial output data in response to said display information signals and said clock pulses; and
  a driver circuit including a serial/parallel converter having its input connected to an output of said parallel/serial converter and producing parallel output data in response to said serial output data and said clock pulses, said serial/parallel converter also producing a serial data as a previous display data in response to said serial output data and said clock pulses, a detection circuit receiving said serial output data as a new display data and said serial data as a previous display data and comparing these data for producing a non-coincidence signal when said new display data and said previous display data are out of coincidence, a segment selection circuit responsive to said non-coincidence signal for generating a segment selection signal to select only a segment whose display state is to be changed, and a plurality of driver means one of which is selected in response to said selection signal to produce bleaching and coloring signals in response to said parallel output data for thereby driving only said segment whose display state is to be changed.

2. A driver circuit according to claim 1, in which each of said driver means comprises gate means responsive to said parallel output data from said serial/parallel converter and each of said segment selection signals, and electronic switching means actuated by said gate means to control the direction of flow of the electric current flowing through each of said segment electrodes.

3. An electronic timepiece comprising, in combination:
  a frequency standard providing a relatively high frequency signal;
  a frequency divider providing a time unit signal in response to said relatively high frequency signal;
  a timekeeping circuit responsive to said time unit signal for producing time information signals;
  a decoder for generating display information signals in response to said time information signals;
  a display device composed of electrochromic display device including a common electrode connected to a power supply and a plurality of segment electrodes associated with said common electrode to provide a display of time data;
  a parallel/serial converter responsive to said display information signals to provide serial output data;
  a serial/parallel converter for converting said serial output data into a parallel output data and generating another serial output data;
  a detection circuit receiving said serial output data as a new display data and said another serial output data as a previous display data and comparing these data for providing an output signal when said new display data and said previous display data are out of coincidence;
  a segment selection circuit for generating a segment selection signal in response to said output signal to select a segment whose display state is to be changed; and
  a plurality of driver means one of which is selected in response to said segment selection signal to produce bleaching and coloration signals in response to said parallel output data for driving selected one of said plurality of segment electrodes corresponding to said segment whose display state is to be changed.

* * * * *